(12) United States Patent
Munafo

(10) Patent No.: US 10,320,756 B2
(45) Date of Patent: Jun. 11, 2019

(54) SECURE COMMUNICATIONS FOR SENSOR DATA

(71) Applicant: Intel Corporation, Santa Clara, CA (US)

(72) Inventor: Tamir D. Munafo, Har-Hotzbim (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/396,517

(22) Filed: Dec. 31, 2016

(65) Prior Publication Data

US 2018/0191687 A1    Jul. 5, 2018

(51) Int. Cl.
*H04L 29/06*     (2006.01)
*G06F 21/82*     (2013.01)
(Continued)

(52) U.S. Cl.
CPC ........ *H04L 63/0428* (2013.01); *G06F 21/602* (2013.01); *G06F 21/606* (2013.01);
(Continued)

(58) Field of Classification Search
CPC . G06F 21/70; H04L 12/2816; H04L 12/2823; H04L 12/2825; H04L 12/2827; H04L 12/2803; H04L 12/2818; H04L 43/06; H04L 43/065; H04L 43/08; H04L 43/10; H04L 63/0428; H04L 63/0435; H04L 63/061; H04L 63/0471; H04L 9/3247; H04L 9/3242; G06K 19/0716;
(Continued)

(56) References Cited

U.S. PATENT DOCUMENTS

| 2008/0276092 A1* | 11/2008 | Eberhardt | ............ H04L 9/3236 |
| | | | 713/175 |
| 2011/0145578 A1* | 6/2011 | Asano | ................... H04L 9/0866 |
| | | | 713/169 |

(Continued)

FOREIGN PATENT DOCUMENTS

WO    WO 2016/049077 A1    3/2016

OTHER PUBLICATIONS

Surenthar Selvaraj; "Overview of Intel Software Guard Extensions (SGX) Enclave"; (Jun. 6, 2016); 12 pages; <URL: https://software.intel.com/sites/default/files/managed/14/0e/Overview%20of%20Intel%20SGX%20Enclave.pdf >.

(Continued)

*Primary Examiner* — Nelson Giddins
(74) *Attorney, Agent, or Firm* — Thorpe North & Western, LLP; David W. Osborne

(57) ABSTRACT

Technology for communicating secure data from a sensor is disclosed. A data transfer device may comprise at least one sensor to generate sensor data and a security engine to generate a key. The data transfer device may also comprise a hardware interface to couple with the at least one sensor and receive the sensor data, and to generate a security signature using the key with the sensor data, and configured to send the sensor data combined with the security signature to a communication interface of a host device. The data transfer device may also comprise a security enclave configured to receive the key from the security engine and to send the key to an application layer of the host device.

24 Claims, 5 Drawing Sheets

(51) Int. Cl.
*G06F 21/60* (2013.01)
*H04L 9/32* (2006.01)

(52) U.S. Cl.
CPC ............ *G06F 21/82* (2013.01); *H04L 9/3242* (2013.01); *H04L 9/3247* (2013.01); *H04L 63/0435* (2013.01); *H04L 63/061* (2013.01); *H04L 63/123* (2013.01)

(58) Field of Classification Search
CPC ......... G06K 19/0717; G06K 19/09718; G06K 19/0719
See application file for complete search history.

(56) References Cited

U.S. PATENT DOCUMENTS

| | | | |
|---|---|---|---|
| 2014/0075496 A1* | 3/2014 | Prakash | G06F 21/6218 726/1 |
| 2015/0263854 A1* | 9/2015 | Sakumoto | H04L 9/0869 380/44 |
| 2016/0056964 A1 | 2/2016 | Andiappan et al. | |
| 2016/0188873 A1* | 6/2016 | Smith | G06F 21/53 726/22 |
| 2017/0070890 A1* | 3/2017 | Luff | H04W 4/70 |
| 2017/0188250 A1* | 6/2017 | Stevens | H04W 24/08 |

OTHER PUBLICATIONS

International Search Report dated Mar. 14, 2018, in International Application No. PCT/US2018/012004, filed Jan. 1, 2018; 6 pages.

* cited by examiner

400

Receiving sensor data generated by a sensor at a hardware interface of a data transfer device.
410

Receiving a key at the hardware interface from a security engine associated with the data transfer device.
420

Generating a security signature for the sensor data using the key at the hardware interface.
440

Combining the sensor data with the security signature at the hardware interface.
450

Sending the sensor data combined with the security signature from the hardware interface to a communication interface of a host device.
460

Receiving a request to validate the sensor data from an application layer associated with the host device at a security enclave associated with the data transfer device.
470

Generating a second security signature at the security enclave and sending the second security signature to the application layer of the host device in response to the request to validate the sensor data.
480

FIG. 4

SECURE COMMUNICATIONS FOR SENSOR DATA

BACKGROUND

Sensors may be used to detect objects or phenomena such as physical elements, light, sound, vibrations, motion, etc. The sensor may generate sensor data. Sensor data can be referred to as the output of a device that detects and responds to some type of input from the physical environment. The output may be used to provide information or input to another system. In a non-secure environment, the output can potentially be intercepted and altered by a third party before the output is received by the other system. This may lead to errors in the sensor data and/or malicious data being received at the other system.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 4 is a flow diagram of a method for communicating secure data from a sensor in accordance with an example embodiment;

DESCRIPTION OF EMBODIMENTS

Figure 1:
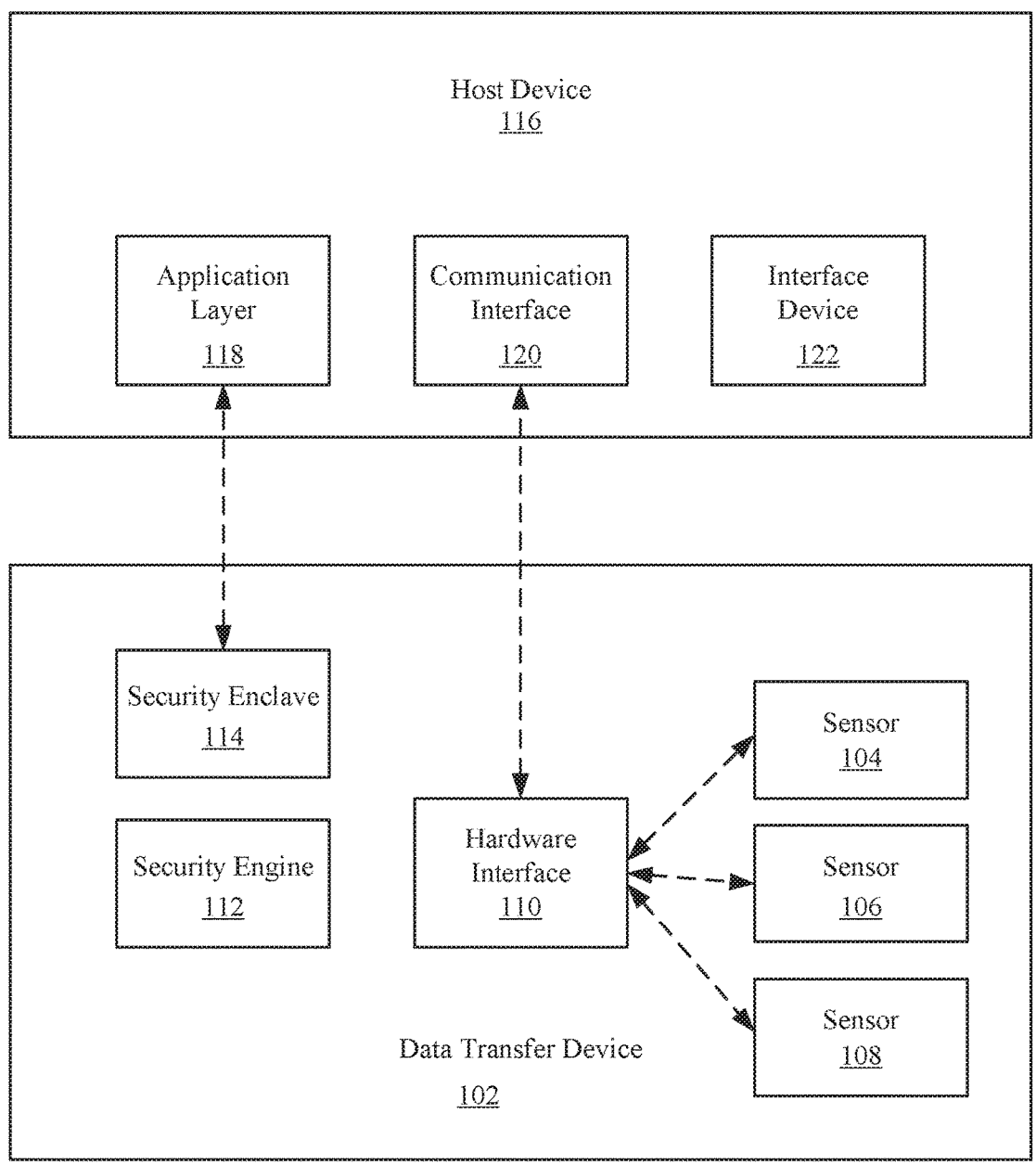
FIG. 1 is a block diagram of a data transfer device for secure communications for sensor data in accordance with an example embodiment.

Before invention embodiments are described, it is to be understood that this disclosure is not limited to the particular structures, process steps, or materials disclosed herein, but is extended to equivalents thereof as would be recognized by those ordinarily skilled in the relevant arts. It should also be understood that terminology employed herein is used for describing particular examples or embodiments only and is not intended to be limiting. The same reference numerals in different drawings represent the same element. Numbers provided in flow charts and processes are provided for clarity in illustrating steps and operations and do not necessarily indicate a particular order or sequence.

Furthermore, the described features, structures, or characteristics can be combined in any suitable manner in one or more embodiments. In the following description, numerous specific details are provided, such as examples of layouts, distances, network examples, etc., to convey a thorough understanding of various invention embodiments. One skilled in the relevant art will recognize, however, that such detailed embodiments do not limit the overall inventive concepts articulated herein, but are merely representative thereof.

As used in this written description, the singular forms "a," "an" and "the" include express support for plural referents unless the context clearly dictates otherwise. Thus, for example, reference to "a proximity sensor" includes a plurality of such proximity sensors.

Reference throughout this specification to "an example" means that a particular feature, structure, or characteristic described in connection with the example is included in at least one invention embodiment. Thus, appearances of the phrases "in an example" or "in an embodiment" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various invention embodiments and examples can be referred to herein along with alternatives for the various components thereof. It is understood that such embodiments, examples, and alternatives are not to be construed as de facto equivalents of one another, but are to be considered as separate and autonomous representations under the present disclosure.

Furthermore, the described features, structures, or characteristics can be combined in any suitable manner in one or more embodiments. In the following description, numerous specific details are provided, such as examples of layouts, distances, network examples, etc., to provide a thorough understanding of invention embodiments. One skilled in the relevant art will recognize, however, that the technology can be practiced without one or more of the specific details, or with other methods, components, layouts, etc. In other instances, well-known structures, materials, or operations may not be shown or described in detail to avoid obscuring aspects of the disclosure.

In this disclosure, "comprises," "comprising," "containing" and "having" and the like can have the meaning ascribed to them in U.S. patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. patent law. "Consisting essentially of" or "consists essentially of" have the meaning generally ascribed to them by U.S. patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the composition's nature or characteristics would be permissible if present under the "consisting essentially of" language, even though not expressly recited in a list of items following such terminology. When using an open ended term in this written description, like "comprising" or "including," it is understood that direct support should be afforded also to "consisting essentially of" language as well as "consisting of" language as if stated explicitly and vice versa.

The terms "first," "second," "third," "fourth," and the like in the description and in the claims, if any, are used for distinguishing between similar elements and not necessarily for describing a particular sequential or chronological order. It is to be understood that any terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

As used herein, comparative terms such as "increased," "decreased," "better," "worse," "higher," "lower," "enhanced," and the like refer to a property of a device, component, or activity that is measurably different from other devices, components, or activities in a surrounding or adjacent area, in a single device or in multiple comparable devices, in a group or class, in multiple groups or classes, or as compared to the known state of the art. For example, a data set that has an "increased" risk of error can refer to a set of data that because it has been transmitted without a verification protocol is more likely to be incorrect than a set of data that has been transmitted with a verification protocol.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases, depend on the specific context. However, generally speaking, the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint. However, it is to be understood that even when the term "about" is used in the present specification in connection with a specific numerical value, that support for the exact numerical value recited apart from the "about" terminology is also provided.

Numerical amounts and data may be expressed or presented herein in a range format. It is to be understood, that such a range format is used merely for convenience and brevity, and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 1.5, 2, 2.3, 3, 3.8, 4, 4.6, 5, and 5.1 individually.

This same principle applies to ranges reciting only one numerical value as a minimum or a maximum. Furthermore, such an interpretation should apply regardless of the breadth of the range or the characteristics being described.

As used herein, the term "circuitry" can refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some aspects, the circuitry can be implemented in, or functions associated with the circuitry can be implemented by, one or more software or firmware modules. In some aspects, circuitry can include logic, at least partially operable in hardware.

Various techniques, or certain aspects or portions thereof, may take the form of program code (i.e., instructions) embodied in tangible media, such as floppy diskettes, compact disc-read-only memory (CD-ROMs), hard drives, transitory or non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term "processor" can include general purpose processors, specialized processors such as VLSI, FPGAs, or other types of specialized processors, as well as base band processors used in transceivers to send, receive, and process wireless communications.

It should be understood that many of the functional units described in this specification may have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Sensors may be employed to capture or generate sensor data that may be sent to another device or system for consumption. The sensor data may be data that is generated in response to the physical environment where the sensor is located. The sensor may be coupled to or in communication with a data transfer device such as a sensor hub. The data transfer device may receive data from a plurality of sensors and then send that data to another device or system such as a host device. The host device then uses the data as input to perform calculations or operations. The data sent from the data transfer device to the host device may be sent in an unsecure manner such that the data may be intercepted by a third party. The third party may intentionally or unintentionally corrupt the data causing errors in the data or malicious attacks against the host device.

Aspects of the technology provide for secure communications of the sensor data between the data transfer device and the host device. For example, the data transfer device may comprise a security engine to generate a key that is used by a hardware interface of the data transfer device to generate a security signature based on the sensor data. The sensor data is then sent to the host device combined with the security signature. For example, the security signature may be embedded in the sensor data as metadata. The security engine may also send the key to a security enclave at the data transfer device. In one aspect, the key may be a hash function and the security signature may be a hash. The security enclave may then send the key to the host device. The host device then employs the key with the sensor data to generate a second security signature. The host device then compares to the security signature to the second security signature. If a match is found then the sensor data received from the data transfer device is trusted. If a match is not found then the host device discards the sensor data.

FIG. 1 is a diagram illustrating environment 100 with an exemplary data transfer device for secure communications for sensor data. The environment 100 depicts a data transfer device 102 and a host device 116. The data transfer device 102 may be a device that receives sensor data from a sensor 104. The data transfer device 102 may receive data from a plurality of sensors such as from sensors 104, 106, and 108. In one aspect, the data transfer device 102 may be a sensor hub that couples with or otherwise communicates with a plurality of sensors. The sensors 104, 106, and 108 may be permanently attached to the sensor hub or may be temporarily coupled or mated with the sensor hub. The senor hub may have physical ports to physically mate with the sensor and transfer data from the sensor. In one aspect, the data transfer device 102 is a camera where the sensor 104 is an image-capturing sensor such as a charge-coupled device. It should be appreciated that the data transfer device 102 may be any type of device for transferring data from a sensor such as a sensor hub, a virtual reality device, a camera, or an embedded controller.

The sensors 104, 106, and 108 may be any type of sensors that capture or generate sensor data from the surrounding physical environment. The sensor data may be raw data generated by the sensor or may be processed by the sensor before it is sent to the data transfer device 102. The sensors 104, 106, and 108 may transfer or send sensor data to the data transfer device 102 in real time as the sensor data is generated or may store the sensor data and send the stored sensor data to the data transfer device 102 at a later time. The sensors 104, 106, and 108 may be, but are not limited to bio or biometric sensors, location sensors, image capturing sensors, fusion sensors, motion sensors, gas sensors, light sensors, temperature sensors, ultrasonic sensors, vibration sensors, IR sensors, electrical sensors, sound sensors, tactile sensors, etc. The data transfer device 102 may comprise any number of sensors and may use more than one type of technology for receiving sensor data from the sensors such as wired or wireless technology.

In one aspect, the data transfer device 102 comprises a hardware interface 110 for receiving sensor data from the sensors 104, 106, and 108. The path for transferring data from the sensors to the hardware interface 110 may be described as a sensor data path. The hardware interface may comprise wired or wireless connections and may use protocols for sending or receiving data. The hardware interface 110 may store the sensor data from the sensors 104, 106, and 108 in a data store local to the data transfer device 102. The data transfer device 102 may also comprise a security engine 112 for providing a key such as a key for encryption of data. The security engine 112 may have the ability to generate a random key or may store a number of pre-configured or pre-provisioned keys. It should be appreciated that the key may be any type of key including, but not limited to, a symmetric key, an asymmetric key, an RSA key pair, a public and private key, etc. In one aspect, the security engine 112 periodically generates or provides a new key. The security engine 112 may provide the key to the hardware interface 110. The hardware interface 110 may use the key to perform operations on the sensor data to generate a security signature. The security signature may be a unique signature that is created based on the sensor data itself after the sensor data is operated on by the key. The security signature may identify both the source of the sensor data and the time the sensor data was created. For example, the key may be a hash function and the security signature is a hash. A hash function may be a function that is used to map data of arbitrary size to data of fixed size. The values returned by a hash function may be called hash values, hash codes, digests, or simply hashes.

For an RSA key or public and private key, the public part of the key may be signed by a unique dedicated certificate that is stored on the data transfer device 102. The public part of the key signed by the certificate may then be sent to the security enclave 114. The security enclave 114 may verify that the public part of the key is signed correctly and then create a random symmetric key and encrypt the symmetric key with the public part of the key. The encrypted symmetric public key may then be used with the private key to generate the security signature.

The security engine 112 may combine the sensor data with the security signature. This may be accomplished by embedding the sensor data with the security signature. For example, the security signature may be metadata associated with the sensor data. The hardware interface 110 may then send the sensor data combined with the security signature to a communication interface 120 of a host device 116. The hardware interface 110 may send the sensor data combined with the security signature as data packets. In one aspect, the security engine 112 generates a new key for each data communication that is sent from the hardware interface 110 to the host device 116.

The host device 116 may be a device such as a computer system that receives sensor data as input and then employs the sensor data to perform calculations, operations, or other useful processes to generate an output. The host device 116 may be any type of electronic device including, but not limited to, a desktop computer, a server computer, a laptop, a smart phone, a tablet, a mobile device, etc. The data transfer device 102 and the host device 116 may communicate with one another over a direct connection or may communicate over a network such as a local area network, a wireless network, or the internet. The host device may comprise an operating system and applications. For example, an application may have an application layer 118 and the operating system may have a communication interface 120 such as a driver for a component. The communication interface 120 may also be described as a host embedded controller interface. A Host Embedded Controller Interface (HECI) provides a bi-directional fully asynchronous communications interface between software on the host device 116 and firmware on the data transfer device 102. In one aspect, the primary role of a HECI interface is to transfer messages between software on the host device 116 and firmware on the data transfer device 102.

The host device 116 may also comprise an interface device 122 that is a human interface device to interface with a user of the host device 116. The interface device 122 may be an input or output device such as a display, a mouse, a keyboard, a touchscreen, etc.

The hardware interface 110 may send the sensor data combined with the security signature to the communication interface 120 of the host device 116 where the communication interface 120 then sends the sensor data combined with the security signature to the application layer requesting this data. The application layer 118 may then send a request to the data transfer device 102 to validate the sensor data received at the communication interface 120. A security enclave 114 may be used to assist the application layer 118 in validating the sensor data received at the communication interface 120. The security enclave 114 may receive the key from the security engine 112 where the key is the same key that was used by the hardware interface 110 to create the security signature. The security enclave 114 then sends the key to the application layer 118. In one aspect, the application layer 118 then uses the key received from the security enclave 114 to operate on the sensor data received from the communication interface 120 to generate a second security signature. The application layer 118 then compares the second security signature with the security signature. If the second security signature matches the security signature then the sensor data is validated and trusted by the application layer 118. If the second security signature does not match the security signature then the sensor data is not valid and the application layer 118 discards the sensor data received from the communication interface 120. Thus the application layer 118 may ensure that the sensor data sent from the data transfer device 102 to the communication interface 120 of the host device 116 has not been intercepted and altered by a third party and may also ensure that the sensor data is free of errors. The use of the security engine 112 with the hardware interface 110 to generate a security signature for purposes of secure data or data integrity may be described as an out-of-band mechanism to encode a security signature to each packet of sensor data.

In an alternative embodiment, the application layer 118 does not generate the second security signature but instead relies on the security enclave 114 to generate the second security signature. In this example, the security enclave 114 may receive the sensor data from the hardware interface 110 and use the key to generate a second security signature independent from the security signature generated by the security engine 112. The security signature is then sent from the security enclave 114 to the application layer 118. Either the application layer 118 or the security enclave 114 may compare the second security signature with the security signature to determine if the sensor data is valid.

In an alternative embodiment, the security engine 112 does not send the key to the hardware interface 110 and the security engine 112 uses the key with the sensor data from the hardware interface 110 to generate the security signature. The security engine 112 would then send the security signature to the hardware interface 110 for the hardware interface 110 to combine the security signature with the sensor data and send both to the host device 116.

In one aspect, the host device 116 and the data transfer device 102 are part of the same system where the hardware interface 110 is an embedded controller and the host device 116 further comprises a second embedded controller. The embedded controller in the data transfer device 102 and the second embedded controller in the host device 116 may be configured to transfer data, such as sensor data, between one another. The security engine 112 may be employed to provide a key to the embedded controller and the embedded controller may generate a security signature based on the sensor data using the key. The security signature and the sensor data may then be combined and sent to the second embedded controller. The second embedded controller may receive the same key from the security enclave 114. The second embedded controller may then use the key to generate a second security signature based on the sensor data received from the embedded controller. The second embedded controller may then determine if the sensor data is valid or authentic based on comparing the security signature with second security signature. Alternately, the second embedded controller may rely on the security enclave 114 to generate the second security signature. By employing the components and techniques of the present technology, a system with two embedded controllers may ensure that data transferred between the two embedded controllers was not altered by a malfunction of the system.

Figure 2:
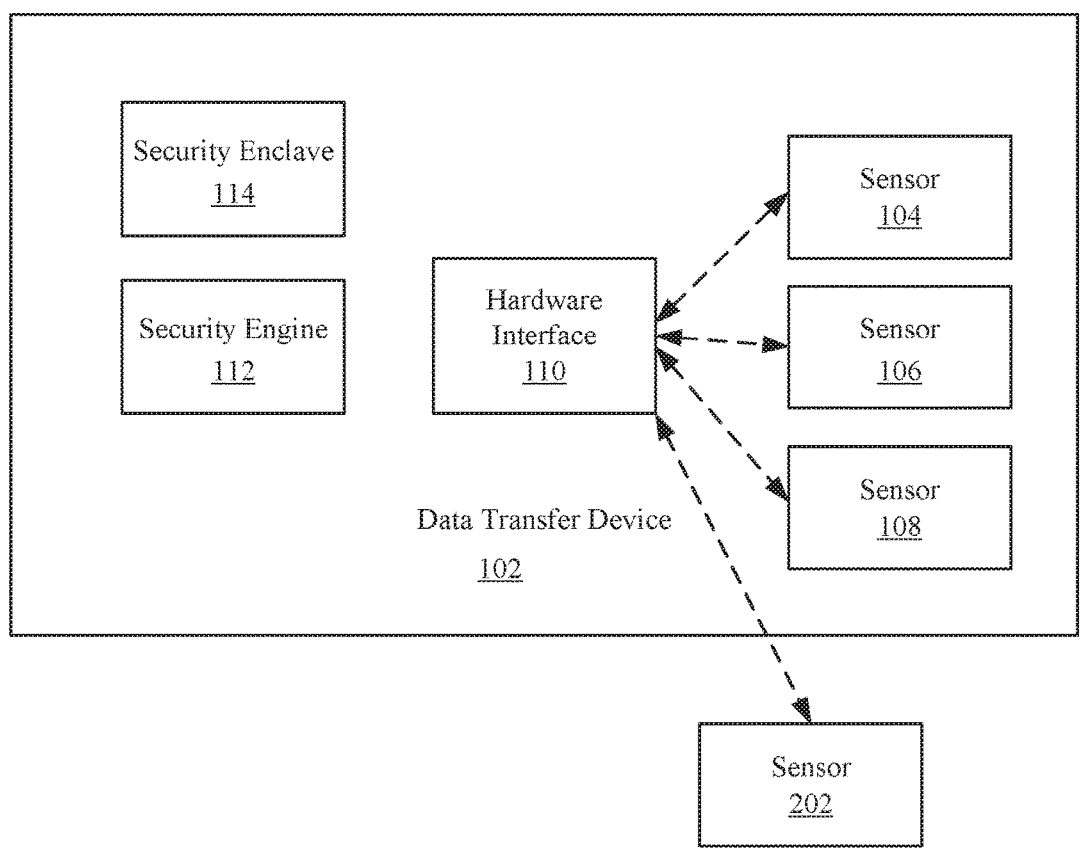
FIG. 2 is a block diagram of a data transfer device for secure communications with an external sensor in accordance with an example embodiment.

FIG. 2 is a diagram illustrating environment 200 with an exemplary data transfer device for secure communications with an external sensor. The data transfer device 102 of FIG. 2 may have all the same features, capabilities, and components of the data transfer device 102 of FIG. 1. Environment 200 depicts sensor 202 external to the data transfer device 102. The sensor 202 may be a sensor similar to the sensors 104, 106, and 108 of FIG. 1 but is not physically coupled to the data transfer device 102. It should be appreciated that that the data transfer device 102 may be able to communicate with sensors that are both coupled and not coupled to the data transfer device 102. In one aspect, the sensor 202 communicates with the data transfer device 102 via wireless protocols and techniques.

Figure 3:
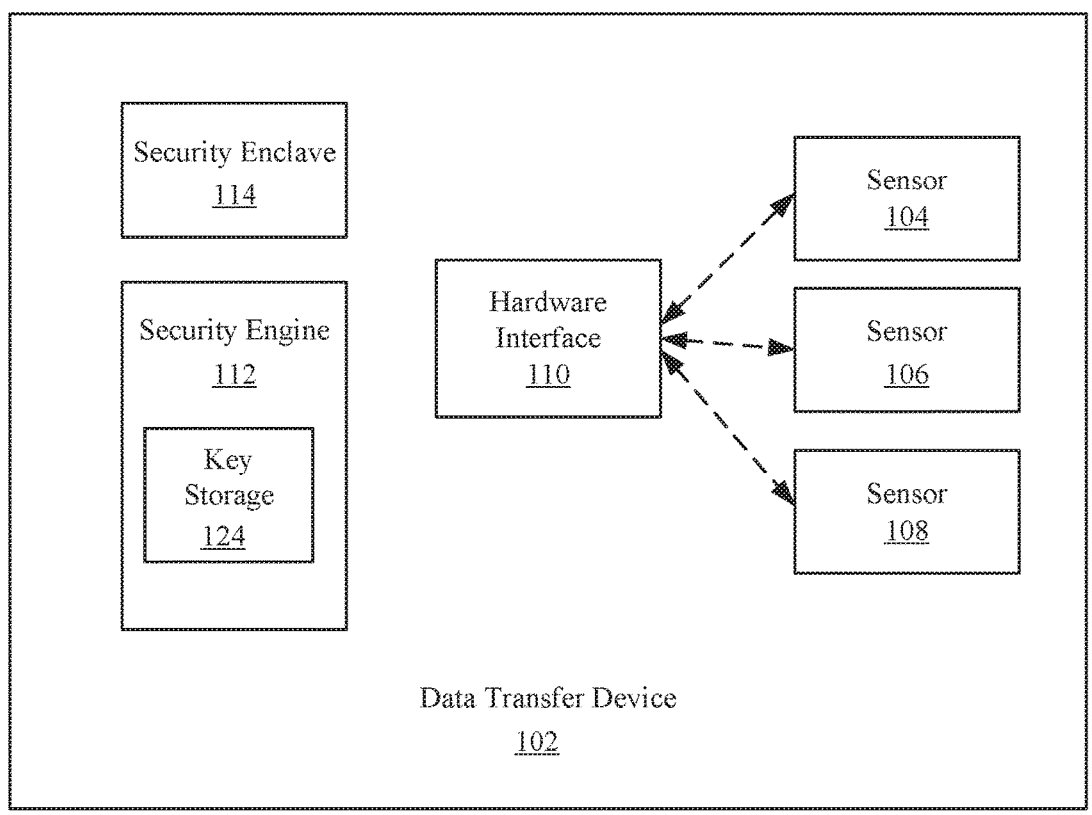
FIG. 3 is a block diagram of a data transfer device for secure communications with a security engine comprising a key storage in accordance with an example embodiment.

FIG. 3 is a diagram illustrating environment 300 with an exemplary data transfer device for secure communications with a security engine comprising a key storage. The data transfer device 102 of FIG. 2 may have all the same features, capabilities, and components of the data transfer device 102 of FIG. 1. Environment 300 depicts the security engine 112 with a key storage 124. The key storage 124 may be a data store that is employed by the security engine 112 for storing a plurality of keys used to generate a security signature for sensor data. In one aspect, the key storage 124 stores symmetric keys. The symmetric keys may be pre-provisioned or pre-configured to avoid the need for recreated new keys. In one aspect, a symmetric key may be sent at the beginning of each connection for a sensor data communication.

As is shown in FIG. 4, the present disclosure additionally provides exemplary method 400 for communicating secure data from a sensor. Such a method can include receiving sensor data generated by a sensor at a hardware interface of a data transfer device, as in block 410. The method further includes receiving a key at the hardware interface from a security engine associated with the data transfer device, as in block 420. The method further includes, generating a security signature for the sensor data using the key at the hardware interface, as in block 430. The method further includes, combining the sensor data with the security signature at the hardware interface, as in block 440. The method further includes, sending the sensor data combined with the security signature from the hardware interface to a communication interface of a host device, as in block 450. The method further includes, receiving a request to validate the sensor data from an application layer associated with the host device at a security enclave associated with the data transfer device, as in block 460. The method further includes, generating a second security signature at the security enclave and sending the second security signature to the application layer of the host device in response to the request to validate the sensor data, as in block 470.

Blocks 460 and 470 of method 400 depict steps in which the host device employs components of the data transfer device, such as the security enclave, to validate the sensor data. In one aspect, the method 400 does not include blocks 460 and 470, but rather the host device receives the key from the security enclave at an application layer of the host device and the application layer employs the key with the sensor data to generate a second security signature to determine if the sensor data is valid or not.

Figure 5:
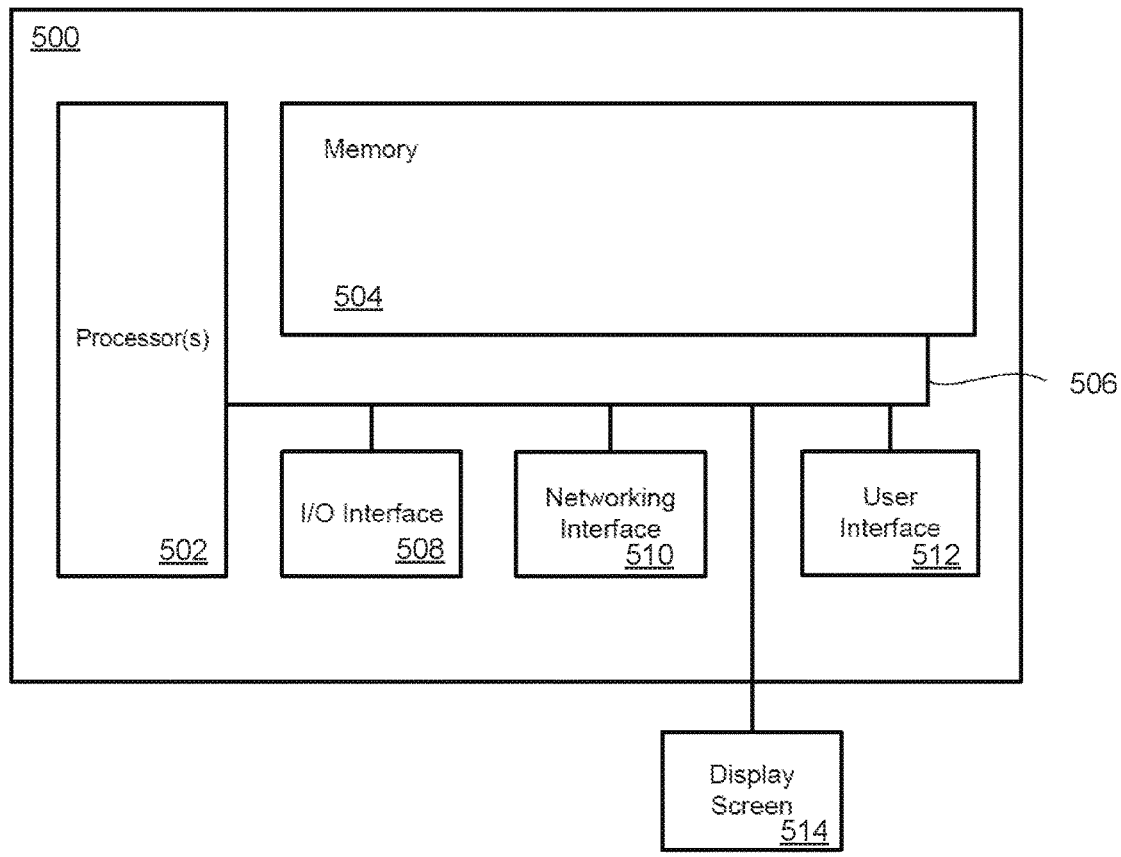
FIG. 5 is a block diagram of an example computer system in accordance with another example embodiment.

FIG. 5 depicts an exemplary system upon which embodiments of the present disclosure may be implemented. For example, the system of FIG. 5 may be the host device 116 or the data transfer device 102 of FIG. 1. It should be appreciated that some of the components of the system of FIG. 5 may not be used for the host device 116 or the data transfer device 102 of FIG. 1. The system can include a memory controller 502, a plurality of memory 504, a processor 506, and circuitry 508. The circuitry can be configured to implement the hardware described herein for virtual reality device 100 of FIG. 1. Various embodiments of such systems for FIG. 5 can include smart phones, laptop computers, handheld and tablet devices, CPU systems, SoC systems, server systems, networking systems, storage systems, high capacity memory systems, or any other computational system.

The system can also include an I/O (input/output) interface 510 for controlling the I/O functions of the system, as well as for I/O connectivity to devices outside of the system. A network interface can also be included for network connectivity, either as a separate interface or as part of the I/O interface 510. The network interface can control network communications both within the system and outside of the system. The network interface can include a wired interface, a wireless interface, a Bluetooth interface, optical interface, and the like, including appropriate combinations thereof. Furthermore, the system can additionally include various user interfaces, display devices, as well as various other components that would be beneficial for such a system.

The system can also include memory in addition to memory 504 that can include any device, combination of devices, circuitry, and the like that is capable of storing, accessing, organizing and/or retrieving data. Non-limiting examples include SANs (Storage Area Network), cloud storage networks, volatile or non-volatile RAM, phase change memory, optical media, hard-drive type media, and the like, including combinations thereof.

The processor 506 can be a single or multiple processors, and the memory can be a single or multiple memories. The local communication interface can be used as a pathway to facilitate communication between any of a single processor, multiple processors, a single memory, multiple memories, the various interfaces, and the like, in any useful combination.

The system can also include a user interface 512 a graphical user interface for interacting with the user. The system can also include a display screen 514 for displaying images and the user interface 512.

The disclosed embodiments may be implemented, in some cases, in hardware, firmware, software, or any combination thereof. Portions of the disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

Examples

The following examples pertain to specific technology embodiments and point out specific features, elements, or steps that may be used or otherwise combined in achieving such embodiments.

In one example there is provided a data transfer device for communicating secure data from a sensor, comprising:
- at least one sensor configured to generate sensor data;
- a security engine configured to generate a key;
- a hardware interface configured to couple with the at least one sensor and receive the sensor data, and configured to generate a security signature using the key with the sensor data, and configured to send the sensor data combined with the security signature to a communication interface of a host device; and
- a security enclave configured to receive the key from the security engine and to send the key to an application layer of the host device.

In one example of a data transfer device for communicating secure data from a sensor, the data transfer device is selected from the group of data transfer devices consisting of: a sensor hub, a virtual reality device, a camera, and an embedded controller.

In one example of a data transfer device for communicating secure data from a sensor, the at least one sensor is located remote from the data transfer device.

In one example of a data transfer device for communicating secure data from a sensor, the at least one sensor communicates with the data transfer device wirelessly.

In one example of a data transfer device for communicating secure data from a sensor, the at least one sensor is physically coupled to the data transfer device.

In one example of a data transfer device for communicating secure data from a sensor, the key is a hash function and the security signature is a hash generated by the hash function operating on the sensor data.

In one example of a data transfer device for communicating secure data from a sensor, the hardware interface embeds the security signature into the sensor data as metadata.

In one example of a data transfer device for communicating secure data from a sensor, the security engine periodically generates a new key for use in generating security signatures.

In one example of a data transfer device for communicating secure data from a sensor, the hardware interface sends the sensor data combined with the security signature as data packets.

In one example of a data transfer device for communicating secure data from a sensor, the at least one sensor is selected from a group of sensors consisting of: a bio sensor, a location sensor, an image capturing sensor, a fusion sensor, a motion sensor, a gas sensor, a light sensor, a temperature sensor, an ultrasonic sensor, a vibration sensor, infrared sensor, an electrical sensor, a sound sensor, and a tactile sensor.

In one example of a data transfer device for communicating secure data from a sensor, the host device is configured to trust the sensor data if the security signature from the hardware interface matches a second security signature generated at the host device using the key from the security enclave with the sensor data received at the host device.

In one example of a data transfer device for communicating secure data from a sensor, the host device is configured to discard the sensor data if the security signature from the hardware interface does not match a second security signature generated at the host device using the key from the security enclave with the sensor data received at the host device.

In one example of a data transfer device for communicating secure data from a sensor, the data transfer device comprises a plurality of sensors with more than one sensor type and the data transfer device is configured to send data securely to the host device for each of the plurality of sensors.

In one example of a data transfer device for communicating secure data from a sensor, the key is a symmetric key and the security engine stores a plurality of symmetric keys that are pre-provisioned.

In one example of a data transfer device for communicating secure data from a sensor, the host device or the data transfer device employs the security enclave to generate the security signature.

In one example there is provided a system for communicating secure data from a sensor, comprising:
- a data transfer device comprising:
  - at least one sensor configured to generate sensor data;
  - a security engine configured to generate a key;
  - a hardware interface configured to couple with the at least one sensor and receive the sensor data, and configured to generate a security signature using the key with the sensor data, and configured to combine the sensor data with the security signature; and
  - a security enclave configured to receive the key from the security engine;
- a host device configured to interface with a user, comprising:
  - a communication interface configured to receive the sensor data combined with the security signature from the hardware interface; and
  - an application layer configured to receive the key from the security enclave, and configured to generate a second security signature using the key from the security enclave with the sensor data received at the communication interface.

In one example of a system for communicating secure data from a sensor, the application layer is further configured to trust the sensor data if the security signature from the hardware interface matches the second security signature generated at the application layer.

In one example of a system for communicating secure data from a sensor, the application layer is further configured to discard the sensor data if the security signature from the hardware interface does not match the second security signature generated at the application layer.

In one example of a system for communicating secure data from a sensor, the data transfer device is selected from the group of data transfer devices consisting of: a sensor hub, a virtual reality device, a camera, and an embedded controller.

In one example of a system for communicating secure data from a sensor, the at least one sensor is located remote from the data transfer device.

In one example of a system for communicating secure data from a sensor, the at least one sensor communicates with the data transfer device wirelessly.

In one example of a system for communicating secure data from a sensor, the at least one sensor is physically coupled to the data transfer device.

In one example of a system for communicating secure data from a sensor, the key is a hash function and the security signature is a hash generated by the hash function operating on the sensor data.

In one example of a system for communicating secure data from a sensor, the hardware interface embeds the security signature into the sensor data as metadata.

In one example of a system for communicating secure data from a sensor, the security engine periodically generates a new key for use in generating security signatures.

In one example of a system for communicating secure data from a sensor, the hardware interface sends the sensor data combined with the security signature as data packets.

In one example of a system for communicating secure data from a sensor, the at least one sensor is selected from a group of sensors consisting of: a bio sensor, a location sensor, an image capturing sensor, a fusion sensor, a motion sensor, a gas sensor, a light sensor, a temperature sensor, an ultrasonic sensor, a vibration sensor, infrared sensor, an electrical sensor, a sound sensor, and a tactile sensor.

In one example of a system for communicating secure data from a sensor, the data transfer device comprises a plurality of sensors with more than one sensor type and the data transfer device is configured to send data securely to the host device for each of the plurality of sensors.

In one example of a system for communicating secure data from a sensor, the key is a symmetric key and the security engine stores a plurality of symmetric keys that are pre-provisioned.

In one example of a system for communicating secure data from a sensor, the host device or the data transfer device employs the security enclave to generate the security signature.

In one example there is provided, a method for communicating secure data from a sensor including:
  receiving sensor data generated by a sensor at a hardware interface of a data transfer device;
  receiving a key at the hardware interface from a security engine associated with the data transfer device;
  generating a security signature for the sensor data using the key at the hardware interface;
  combining the sensor data with the security signature at the hardware interface;
  sending the sensor data combined with the security signature from the hardware interface to a communication interface of a host device;
  receiving a request to validate the sensor data from an application layer associated with the host device at a security enclave associated with the data transfer device; and
  generating a second security signature at the security enclave and sending the second security signature to the application layer of the host device in response to the request to validate the sensor data.

In one example of a method for communicating secure data from a sensor, the method further comprises, the key is a hash function and the security signature is a hash generated by the hash function operating on the sensor data.

In one example of a method for communicating secure data from a sensor, the method further comprises, the hardware interface embeds the security signature into the sensor data as metadata.

In one example of a method for communicating secure data from a sensor, the method further comprises, the security engine periodically generates a new key for use in generating security signatures.

In one example of a method for communicating secure data from a sensor, the method further comprises, the sending the sensor data combined with the security signature sends data packets.

In one example of a method for communicating secure data from a sensor, the method further comprises, the host device trusts the sensor data if the security signature from the hardware interface matches the second security signature from the security enclave.

In one example of a method for communicating secure data from a sensor, the method further comprises, the host device discards the sensor data if the security signature from the hardware interface does not match the second security signature from the security enclave.

In one example of a method for communicating secure data from a sensor, the method further comprises, the at least one sensor is selected from a group of sensors consisting of: a bio sensor, a location sensor, an image capturing sensor, a fusion sensor, a motion sensor, a gas sensor, a light sensor, a temperature sensor, an ultrasonic sensor, a vibration sensor, infrared sensor, an electrical sensor, a sound sensor, and a tactile sensor.

In one example of a method for communicating secure data from a sensor, the method further comprises, the key is a symmetric key and the security engine stores a plurality of symmetric keys that are pre-provisioned.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology.

What is claimed is:

1. A data transfer device for communicating secure data from a sensor, comprising:
  at least one sensor configured to generate sensor data;
  a security engine configured to generate a key;
  a hardware interface configured to couple with the at least one sensor and receive the sensor data, and configured to generate a security signature using the key with the sensor data, and configured to send a first communication to a host device, the first communication comprising the sensor data combined with the security signature and the first communication is received by a communication interface of the host device; and
  a security enclave configured to receive the key from the security engine and to send a second communication to the host device, the second communication comprising the key and the second communication is received by an application layer of the host device; wherein either:
    the host device is configured to trust the sensor data when the security signature from the hardware interface matches a second security signature generated at the host device using the key from the security enclave with the sensor data received at the host device; or
    the host device is configured to discard the sensor data when the security signature from the hardware interface does not match a second security signature generated at the host device using the key from the security enclave with the sensor data received at the host device.

2. The data transfer device of claim 1, wherein the data transfer device is selected from the group of data transfer devices consisting of: a sensor hub, a virtual reality device, a camera, and an embedded controller.

3. The data transfer device of claim 1, wherein the at least one sensor is located remote from the data transfer device.

4. The data transfer device of claim 1, wherein the at least one sensor communicates with the data transfer device wirelessly.

5. The data transfer device of claim 1, wherein the at least one sensor is physically coupled to the data transfer device.

6. The data transfer device of claim 1, wherein the key is a hash function and the security signature is a hash generated by the hash function operating on the sensor data.

7. The data transfer device of claim 1, wherein the hardware interface embeds the security signature into the sensor data as metadata.

8. The data transfer device of claim 1, wherein the security engine periodically generates a new key for use in generating security signatures.

9. The data transfer device of claim 1, wherein the hardware interface sends the sensor data combined with the security signature as data packets.

10. The data transfer device of claim 1, wherein the at least one sensor is selected from a group of sensors consisting of: a bio sensor, a location sensor, an image capturing sensor, a fusion sensor, a motion sensor, a gas sensor, a light sensor, a temperature sensor, an ultrasonic sensor, a vibration sensor, infrared sensor, an electrical sensor, a sound sensor, and a tactile sensor.

11. The data transfer device of claim 1, wherein the host device is configured to trust the sensor data when the security signature from the hardware interface matches a second security signature generated at the host device using the key from the security enclave with the sensor data received at the host device.

12. The data transfer device of claim 1, wherein the host device is configured to discard the sensor data when the security signature from the hardware interface does not match a second security signature generated at the host device using the key from the security enclave with the sensor data received at the host device.

13. The data transfer device of claim 1, wherein the data transfer device comprises a plurality of sensors with more than one sensor type and the data transfer device is configured to send data securely to the host device for each of the plurality of sensors.

14. The data transfer device of claim 1, wherein the key is a symmetric key and the security engine stores a plurality of symmetric keys that are pre-provisioned.

15. The data transfer device of claim 1, wherein the host device or the data transfer device employs the security enclave to generate the security signature.

16. A method for communicating secure data from a sensor, comprising:
   receiving sensor data generated by a sensor at a hardware interface of a data transfer device;
   receiving a key at the hardware interface from a security engine associated with the data transfer device;
   generating a security signature for the sensor data using the key at the hardware interface;
   combining the sensor data with the security signature at the hardware interface;
   sending a first communication to a host device comprising the sensor data combined with the security signature from the hardware interface to be received by a communication interface of the host device;
   receiving a request to validate the sensor data from an application layer associated with the host device at a security enclave associated with the data transfer device;
   generating a second security signature at the security enclave; and
   sending a second communication to the host device comprising the second security signature to be received by the application layer of the host device in response to the request to validate the sensor data.

17. The method of claim 16, wherein the key is a hash function and the security signature is a hash generated by the hash function operating on the sensor data.

18. The method of claim 16, wherein the hardware interface embeds the security signature into the sensor data as metadata.

19. The method of claim 16, wherein the security engine periodically generates a new key for use in generating security signatures.

20. The method of claim 16, wherein the sending the sensor data combined with the security signature sends data packets.

21. The method of claim 16, wherein the host device trusts the sensor data when the security signature from the hardware interface matches the second security signature from the security enclave.

22. The method of claim 16, wherein the host device discards the sensor data when the security signature from the hardware interface does not match the second security signature from the security enclave.

23. The method of claim 16, wherein the at least one sensor is selected from a group of sensors consisting of: a bio sensor, a location sensor, an image capturing sensor, a fusion sensor, a motion sensor, a gas sensor, a light sensor, a temperature sensor, an ultrasonic sensor, a vibration sensor, infrared sensor, an electrical sensor, a sound sensor, and a tactile sensor.

24. The method of claim 16, wherein the key is a symmetric key and the security engine stores a plurality of symmetric keys that are pre-provisioned.

* * * * *